(12) United States Patent
Henderson et al.

(10) Patent No.: US 10,503,831 B2
(45) Date of Patent: Dec. 10, 2019

(54) SYSTEM AND METHOD FOR TARGETED MESSAGING

(71) Applicant: Cisco Technology, Inc., San Jose, CA (US)

(72) Inventors: Andrew Henderson, Spiddal (IE); Stewart Curry, Booterstown (IE); Keith Griffin, Oranmore (IE)

(73) Assignee: Cisco Technology, Inc., San Jose, CA (US)

( * ) Notice: Subject to any disclaimer, the term of this patent is extended or adjusted under 35 U.S.C. 154(b) by 165 days.

(21) Appl. No.: 15/672,327

(22) Filed: Aug. 9, 2017

(65) Prior Publication Data

US 2019/0050393 A1 Feb. 14, 2019

(51) Int. Cl.
| | |
|---|---|
| *G06F 17/27* | (2006.01) |
| *H04L 12/58* | (2006.01) |
| *H04L 12/18* | (2006.01) |
| *H04L 29/06* | (2006.01) |

(Continued)

(52) U.S. Cl.
CPC ........ *G06F 17/278* (2013.01); *G06F 17/2785* (2013.01); *G06Q 10/1093* (2013.01); *H04L 12/185* (2013.01); *H04L 29/06* (2013.01); *H04L 51/04* (2013.01); *H04L 51/16* (2013.01); *H04L 51/26* (2013.01); *H04L 51/36* (2013.01); *H04L 67/02* (2013.01); *H04L 67/14* (2013.01); *H04L 67/2819* (2013.01); *H04L 67/306* (2013.01); *H04L 67/42* (2013.01)

(58) Field of Classification Search
CPC .............. G06F 17/278; G06F 17/2785; G06Q 10/1093; H04L 67/306; H04L 12/185; H04L 51/04; H04L 29/06; H04L 51/36; H04L 51/16; H04L 51/26; H04L 67/02; H04L 67/42
USPC ........................................ 709/204, 205, 206
See application file for complete search history.

(56) References Cited

U.S. PATENT DOCUMENTS

| | | |
|---|---|---|
| 9,547,832 B2 | 1/2017 | Gordon |
| 9,577,964 B2 | 2/2017 | Anderson |
| 9,582,571 B2 | 2/2017 | Chakra et al. |

(Continued)

OTHER PUBLICATIONS

Chowdhury, Shaiful Alam et al.: Mining Stackoverflow to Filter Out Off-Topic IRC Discussion. (2015), In Proceedings of the 12th Working Conference on Mining Software Repositories (MSR '15). IEEE Press, Piscataway, NJ, USA, 422-425.

(Continued)

*Primary Examiner* — Chris Parry
*Assistant Examiner* — Weiwei Y Stiltner

(57) ABSTRACT

In one embodiment, a system and method for targeted messaging is described. A text-based communication session among at least three participants is monitored. At least one contextual information parameter of a first message in a message input field of a client device associated with a first participant of the at least three participants is detected in in the text-based communication session. It is determined if a second participant of the at least three participants is relevant to the first message, based on the contextual information parameter. A message recipient list for the first message is dynamically updates by removing the second participant from the message recipient list and yielding an updated message recipient list. Related methods, systems, and apparatus are also described.

20 Claims, 10 Drawing Sheets

(51) Int. Cl.
  *H04L 29/08*    (2006.01)
  *G06Q 10/10*    (2012.01)

(56)        References Cited

U.S. PATENT DOCUMENTS 9,596,203  B2     3/2017  Lan et al.
  2015/0312187 A1*  10/2015 Menna .................. G06Q 10/10
                                                    709/206
  2016/0073054 A1*  3/2016  Balasaygun ............. H04N 7/15
                                                    348/14.08
  2018/0253659 A1*  9/2018  Lee ......................... H04L 51/02
  2018/0324135 A1*  11/2018 Bastide ................... H04L 51/32

OTHER PUBLICATIONS

Di Sorbo, Andrea et al.; DECA; Development Emails Content Analyzer, 2016; In Proceedings of the 38th International Conference on Software Engineering Companion (ICSE '16). ACM, New York, NY, USA, 641-644. DOI=http://dx.doi.org/10.1145/2889160.2889170.

Owyang, Jeremiah; When Real Time is *Not* Fast Enough: The Intention Web (Dec. 4, 2009).

Slack Help Center; About Channels and Direct Messages (2017) Can be seen at: https://get.slack.help/hc/en-us/articles/201925108-About-channels-and-direct-messages.

Solis, Brian; The Predictive Web (Jan. 11, 2010).

SpamBayes; SpamBayes Frequently Asked Questions (Nov. 5, 2009).

\* cited by examiner

SYSTEM AND METHOD FOR TARGETED MESSAGING

TECHNICAL FIELD

The present disclosure generally relates to systems and methods for chat room messaging.

BACKGROUND

A chat room is an area on a computer network (including, but not limited to the Internet), where users of the chat room engage in online chat and interaction. Typically, such interactions are text based, although chat applications often support various file-sharing, graphical or video interactions as well. Chat rooms are often implemented in instant messaging (IM) programs or applications. Chat technology has evolved from IM systems towards mobile centric messaging systems. These mobile centric messaging systems are sometime referred to as "Enterprise Messaging" or "Business Messaging" systems. Such systems model conversations, rooms, and so forth, and have gone past the older point-to-point IM systems.

Chat rooms support both one-to-one communication as well as multiple users interacting in the same chat. Typically, users in a particular chat room are generally connected via a shared interest or other similar connection, and chat rooms exist catering for a wide range of subjects.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

In one embodiment, a system and method for targeted messaging is described. A text-based communication session among at least three participants is monitored. At least one contextual information parameter of a first message in a message input field of a client device associated with a first participant of the at least three participants is detected in in the text-based communication session. It is determined if a second participant of the at least three participants is relevant to the first message, based on the contextual information parameter. A message recipient list for the first message is dynamically updates by removing the second participant from the message recipient list and yielding an updated message recipient list. Related methods, systems, and apparatus are also described.

Example Embodiment

Figure 1:
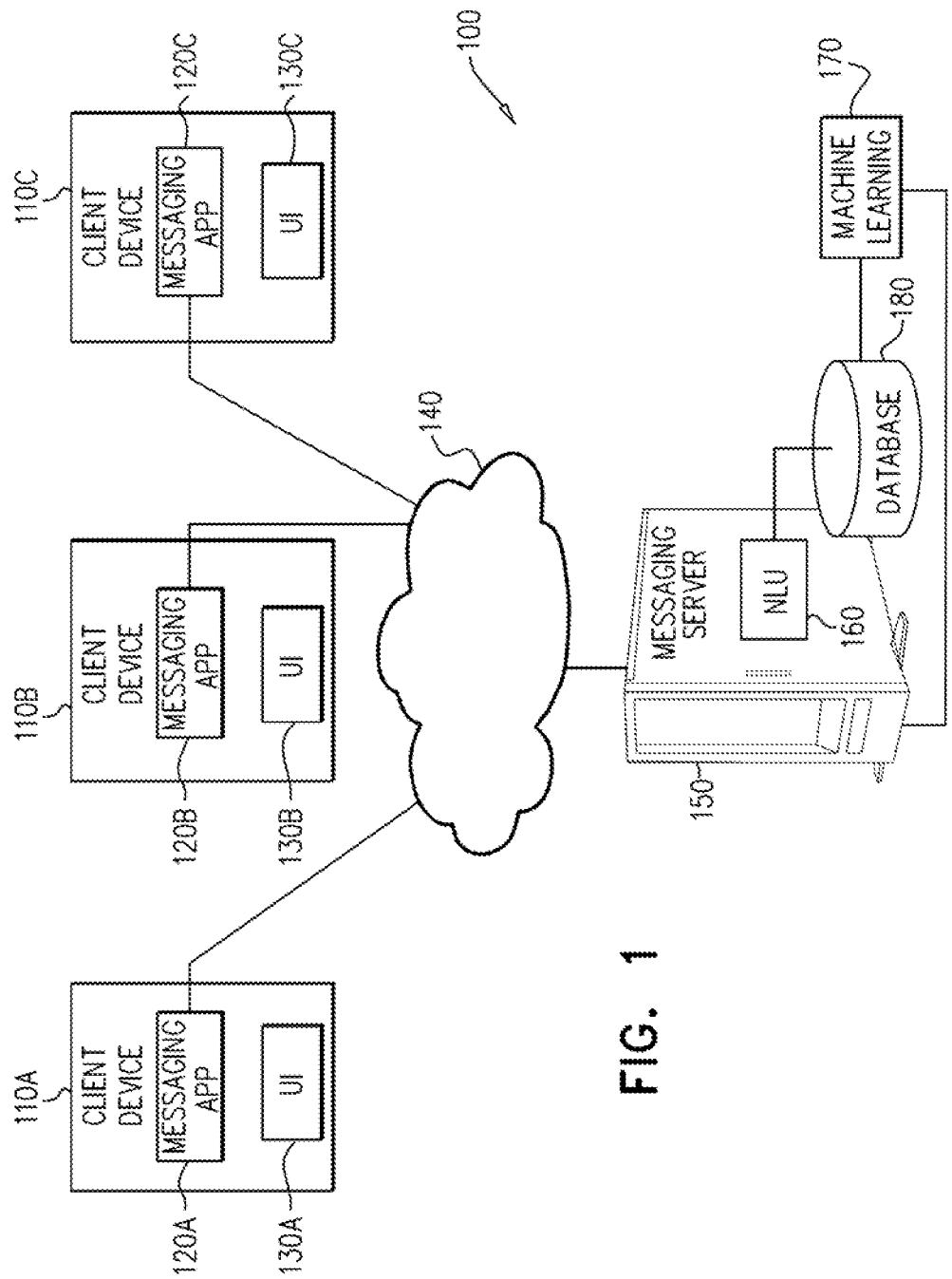
FIG. 1 is a simplified block diagram illustration of a system for targeted messaging constructed and operative in accordance with an embodiment of the present disclosure.

Reference is now made to FIG. 1 which a simplified block diagram illustration of a system 100 for targeted messaging constructed and operative in accordance with an embodiment of the present disclosure. The system 100 of FIG. 1 comprises a first client device 110A, which is used by a user of the first client device 110A to send chat messages to other users of other client devices (such as client devices 110B and 110C). Chat messages, and chat rooms may be considered a platform for a text-based communication among a number of participants. Accordingly, the term "chat", as used herein is used in the sense of a "message thread", i.e., a text message and replies to the initial message. Threaded messages are known in the art. The messages are sent via a messaging application 120A, such as is known in the art. The messaging application 120A may comprise an instant messaging application, an enterprise messaging application, or an application for other messaging system, as may be known in the art. Such systems will be referred to below collectively, in a non-limiting fashion, as "messaging systems". The user of the first client device 110A enters the chat messages using a user interface (UI) 130A.

Users of client devices 110B and 110C receive the chat messages on their own respective client devices 110B, 110C, via the messaging application 120B, 120C resident on their respective client devices 110B, 110C. The users of client devices 110B and 110C view and respond to the chat messages via the user interfaces 130B, 130C resident on their respective client devices 110B, 110C.

The messaging application 120A communicates with messaging applications 120B and 120C via a network 140, over which the chat messages are sent to a messaging server 150. The messaging server 150 monitors the messaging application 120A. As the user of the first client device 110A enters the chat messages using the user interface (UI) 130A, the messaging server 150, as explained below, provides feedback to the user of the first client device 110A based on the nature of what the user of the first client device 110A enters.

The messaging server 150 comprises a natural language understanding (NLU) processor 160, which will be described below in greater detail, with reference to FIG. 2. The NLU processor 160 enables parsing chat messages (being typed by a user prior to selecting the message for sending to the other participants) received at the messaging server 150, and, based on at least one characteristic of participants of a chat room to which the chat message is to be sent, the NLU processor 160 may apply machine learning 170 in order to provide the feedback to user of the first client device 110A about which other users will receive the message being entered. That is to say, a dynamic update of the message recipient list appears to the user of the first client device 110A, so that some participants are removed from the message recipient list, and an updated message recipient list remains. As will be discussed below, once some participants are removed from the message recipient list, further inputs to the message or a thread associated with the message may cause some removed participants to reappear in the message recipient list. It is appreciated the a participant who is removed from the message recipient list might not appear at all in the message recipient list; might appear in the message recipient list greyed out; might appear in the message recipient list with a graphical indication that the recipient in no longer in the message recipient list (e.g., a circle with a diagonal line indicating a "no"); or any other appropriate indication that the participant has been removed from the message recipient list.

Both the NLU processor 160 and the machine learning 170 may be aided by a database 180, which might comprise a shared database, which stores information which might be relevant to the NLU processor 160 and the machine learning 170. For instance, a user profile or other characteristics about a particular user of the messaging application (such as, for instance, the user of the messaging application 110B), might be stored in the database 180. Alternatively, information about previous chats, how language has been used by a particular user, and so forth, may be stored in the database 180. By way of example, such information may include, but not be limited to different languages (e.g., Dutch, Chinese, Spanish, and so forth), as well as language usage patterns, slang expressions, and so forth.

The messaging server 150 determines which users who will receive the message being entered, once the message is sent, on the basis of relevance of the message to the users. For example, (a similar example will be provided in greater depth below) consider a chat room having three participants in Chicago, and three participants in San Jose. A message of "let's go to lunch", entered by one of the chat room participants in Chicago, is most likely only relevant to the other chat room participants physically in Chicago. The messaging server 150 will, accordingly, remove some participants from the message recipient list for whom the message is irrelevant. Accordingly, those chat room participants not physically in Chicago, i.e., those in San Jose will be removed from the message recipient list, as the message is not relevant to them. All further messages in a message thread which began with the "let's go to lunch" will be removed, so that the participants in San Jose do not receive those messages.

It is appreciated that the example of "let's go to lunch" is an example of one type of contextual information which may be used to determine if a participant in the chat (i.e., the message thread) is relevant to the message thread. "Let's go to lunch" is an exemplary action. Other such actions might include any of the following: eating, travelling, meeting, and so forth. Other non-limiting examples of categories of contextual information might include: geographical locations; times; participant rank and other organizational or hierarchical information about a chat room participant; establishments (e.g., restaurants, shops, convention centers); and so forth.

It is appreciated that messages which occur later in a thread might be relevant to participants who have been removed earlier. Continuing with the "let's go to lunch" example, if, in a response to that message a someone replies with a message which may be relevant to all of the participants of this exemplary chat room, e.g., "What did you think about the presentation at yesterday's meeting", the messaging server 150 might add users back into the discussion. Alternatively, those users will miss out on this part of the discussion. Such a situation, although not ideal, corresponds to a situation where the three chat room participants in Chicago discuss last night's presentation in the absence of their colleagues and friends in San Jose.

Figure 2:
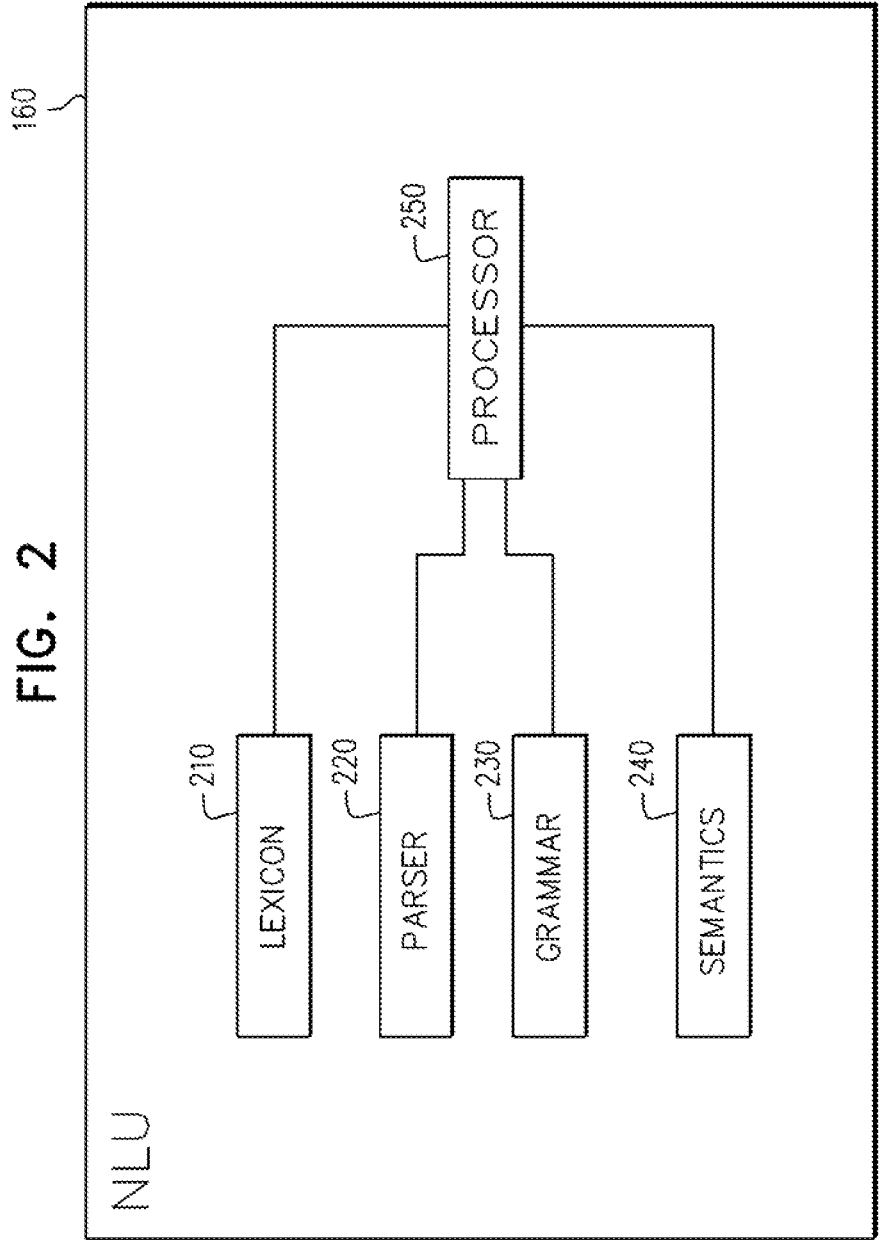
FIG. 2 is a simplified block diagram illustration of an exemplary natural language unit for use in the system of FIG. 1.

Reference is now made to FIG. 2, which is a simplified block diagram illustration of an exemplary NLU processor 160 for use in the system 100 of FIG. 1. Those of skill in the art will appreciate that the configuration of the NLU processor 160 is by way of example only, and other configurations of NLU processors will not preclude their use in the system 100 of FIG. 1.

The NLU processor 160 comprises a lexicon module 210 of at least one language in use among users of devices (such as devices 110A, 110B, and 110C) in communication with the messaging server 150 of FIG. 1. It is appreciated that in some embodiments, the users may be multi-lingual, and as such, support for more than one language may be required in various of the components of the NLU processor 160.

The NLU processor 160 comprises a parser 220 and a grammar module 230 to break sentences in received chat messages into linguistic components which may be processed by the NLU processor 160. The NLU processor 160 may also comprise a semantic system 240 to guide machine comprehension and processing, as is known in the art. The various elements of the NLU processor enumerated above may be interconnected by a central processing unit 250.

Figure 3:
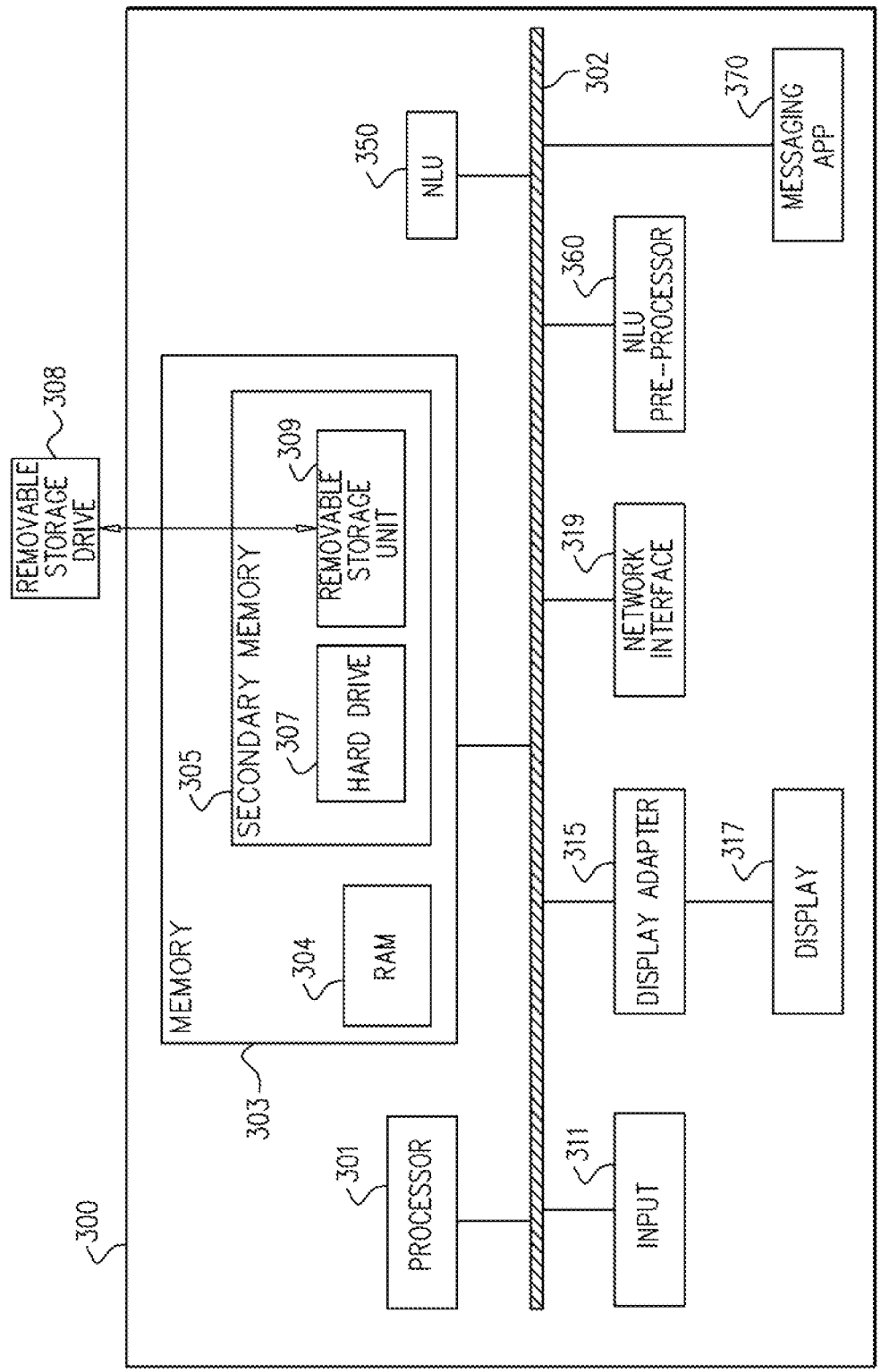
FIG. 3 is a simplified block diagram illustration of one possible embodiment of one of the client devices or the server device for use in the system of FIG. 1.

Reference is now made to FIG. 3, which a simplified block diagram illustration of one possible embodiment of an exemplary device 300 which might comprise one of the client devices 110A-C, or the messaging server 150 for use in the system of FIG. 1. It is appreciated that because of the nature of devices and servers, much of the architecture between the client devices 110A-C and the messaging server 150 may, in fact, be common. Accordingly, FIG. 3 will show both the common elements, as well as those elements which might be particular to one of the client devices 110A-C or the messaging server 150. In such a case, it will be pointed out that the element or component discussed is particularly relevant to one or the other of the client or the server.

The exemplary device 300 is suitable for implementing any of the systems, methods or processes described herein. The exemplary device 300 comprises one or more processors, such as processor 301, providing an execution platform for executing machine readable instructions such as software. One of the processors 301 may be a special purpose processor operative to perform the method for targeted messaging described herein. The processor 301 comprises dedicated hardware logic circuits, in the form of an application-specific integrated circuit (ASIC), field programmable gate array (FPGA), or full-custom integrated circuit, or a combination of such devices. Alternatively or additionally, some or all of the functions of the processor 301 may be carried out by a programmable processor microprocessor or digital signal processor (DSP), under the control of suitable software. This software may be downloaded to the processor in electronic form, over a network, for example. Alternatively or additionally, the software may be stored on tangible storage media, such as optical, magnetic, or electronic memory media.

Commands and data from the processor 301 are communicated over a communication bus 302. The exemplary device 300 also includes a main memory 303, such as a Random Access Memory (RAM) 304, where machine readable instructions may reside during runtime, and a secondary memory 305. The secondary memory 305 may include, for example, a hard disk drive 307 and/or a removable storage drive 308, such as a floppy diskette drive, a magnetic tape drive, a compact disk drive, a flash drive, etc., or a non-volatile memory where a copy of the machine readable instructions or software may be stored. The secondary memory 305 may also include ROM (read only memory), EPROM (erasable, programmable ROM), EEPROM (electrically erasable, programmable ROM), and so forth. In addition to software, data such as might be used for chatting and so forth, and without limiting the generality of the foregoing, or other similar data, may be stored in the main memory 303 and/or the secondary memory 305. The removable storage drive 308 reads from and/or writes to a removable storage unit 309 in a well-known manner.

A user can interface with the exemplary device 300 via a user interface which includes input devices 311, such as a touch screen, a keyboard, a mouse, a stylus, and the like in order to provide user input data. A display adaptor 315 interfaces with the communication bus 302 and a display 317 and receives display data from the processor 301 and converts the display data into display commands for the display 317.

A network interface 319 is provided for communicating with other systems and devices via the network 140 (FIG. 1). The network interface 319 typically includes a wireless interface for communicating with wireless devices in a wireless community of devices. A wired network interface (e.g. an Ethernet interface) may be present as well. The exemplary device 300 may also comprise other interfaces, including, but not limited to Bluetooth, and High-Definition Multimedia Interface (HDMI).

The network interface 319 may be utilized by the system described herein in order to interface between the plurality of client devices 110 a-c and the messaging server 150.

It will be apparent to one of ordinary skill in the art that one or more of the components of the exemplary device 300 may not be included and/or other components may be added as is known in the art. The exemplary device 300 shown in FIG. 3 is provided as an example of a possible platform that may be used, and other types of platforms may be used as is known in the art. One or more of the steps or processes described herein may be implemented as instructions embedded on a computer readable medium and executed on the exemplary device 300. The steps or processes may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running a computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated above may be performed by any electronic device capable of executing the above-described functions.

The NLU 350, typically found at the messaging server 150 (which might be a cloud service, rather than a server in the traditional sense), corresponds to the NLU processor 160 of FIGS. 1 and 2. By contrast, client devices, such as client devices 110A-C might comprise an NLU pre-processor 360 which performs some preprocessing of message text on the client device 110A-C. Alternatively, the NLU 350 might be disposed in the client device 110A-C, rather than at the messaging server 150. In cases where the NLU 350 is disposed in the client device 110A-C, the client device 110A-C typically requests that the messaging server 150 send the client device 110A-C user profile or other user characteristic information for participants in various chats.

In client devices, such as client devices 110A-C (FIG. 1), the exemplary device 300 will comprise messaging application 370 (typically instead of NLU 350). Messaging application 370 generally corresponds to messaging applications 120A-C of FIG. 1.

Reference is now made to FIGS. 4A-4F, which are a depiction of one exemplary embodiment of a usage of the system of FIG. 1. The example provided in the exemplary embodiment of a usage of FIGS. 4A-4F begins in FIG. 4A with a presently unused messaging user interface window 410. The messaging user interface window 420 has a message input field and an enter button 430, as is known in the art.

Figure 4A:
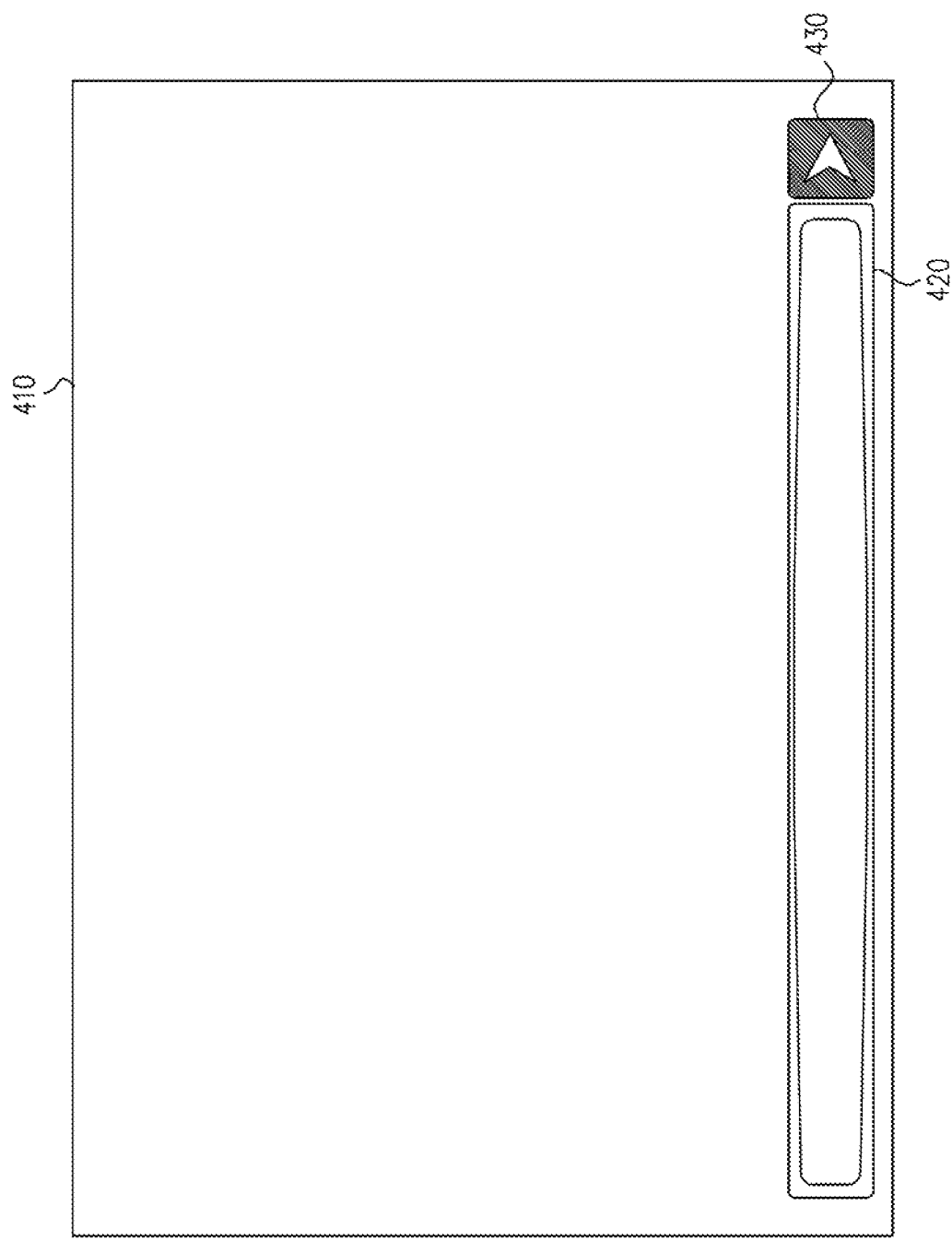
FIGS. 4A-4F are a depiction of one exemplary embodiment of a usage of the system of FIG. 1.
Figure 4B:
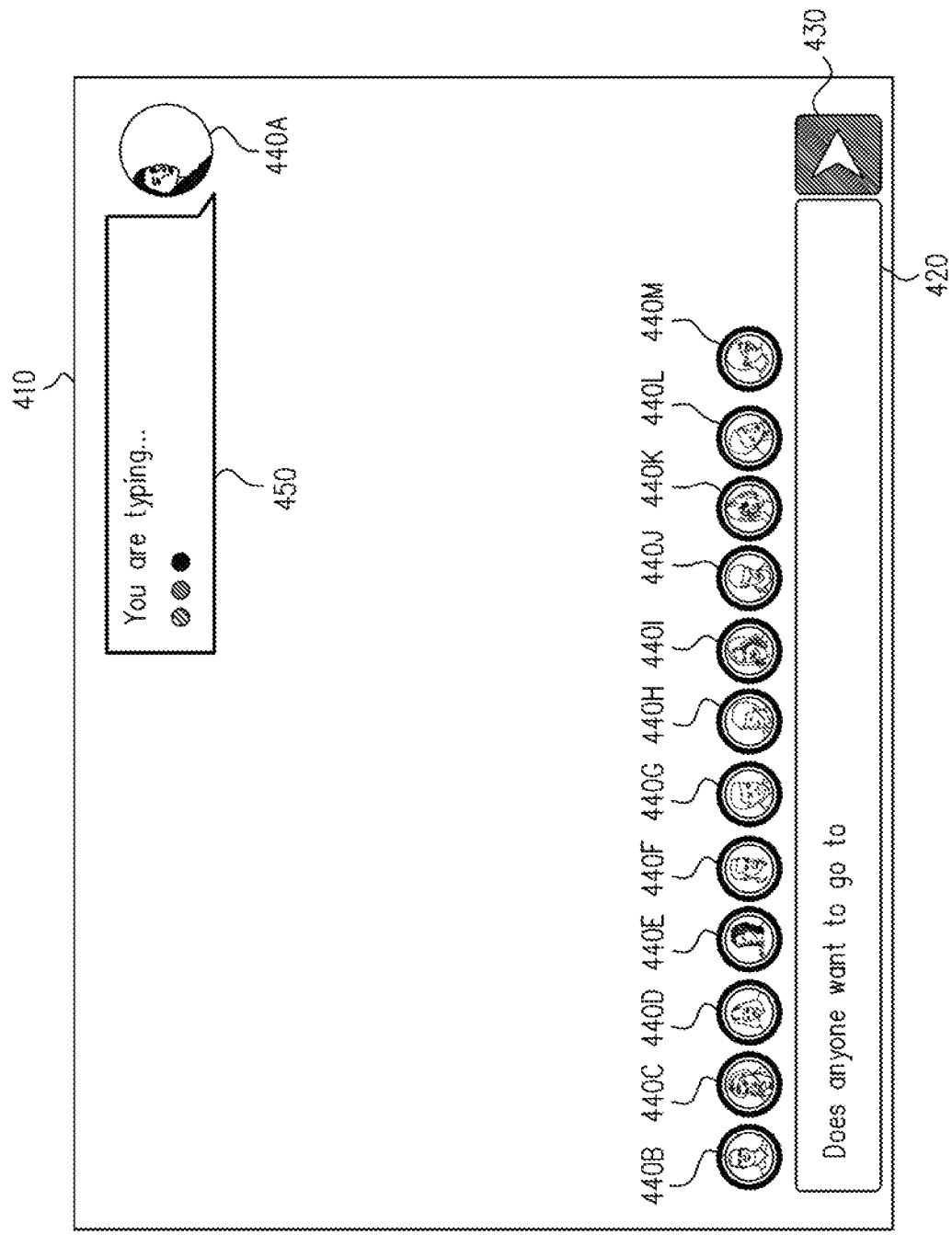

In FIG. 4B, a first user, represented by a first icon 440A opens up a group chat room. The group chat room has participants, represented by various icons 440A-M. In the example presented in FIGS. 4A-4F, the participants are geographically disperse. Some participants might be on different continents, or at least, geographically distant from each other. By way of example, a team which works together as part of a multi-national corporation might have such a chat room for their use. The first user's status, "You are typing" might be indicated in a status/information box 450. The first user begins to enter his or her message, "Does anyone want to go to" into the messaging user interface window 420. It is appreciated, however, that in reality, sometimes, all of the participants of the chat room might be on the same floor of the same building, or different floors of the same building, or in two different buildings located across the street, and so forth. Alternatively, the basis for removing some participants of the chat may be due to other factors, as will be explained, below.

Figure 4C:
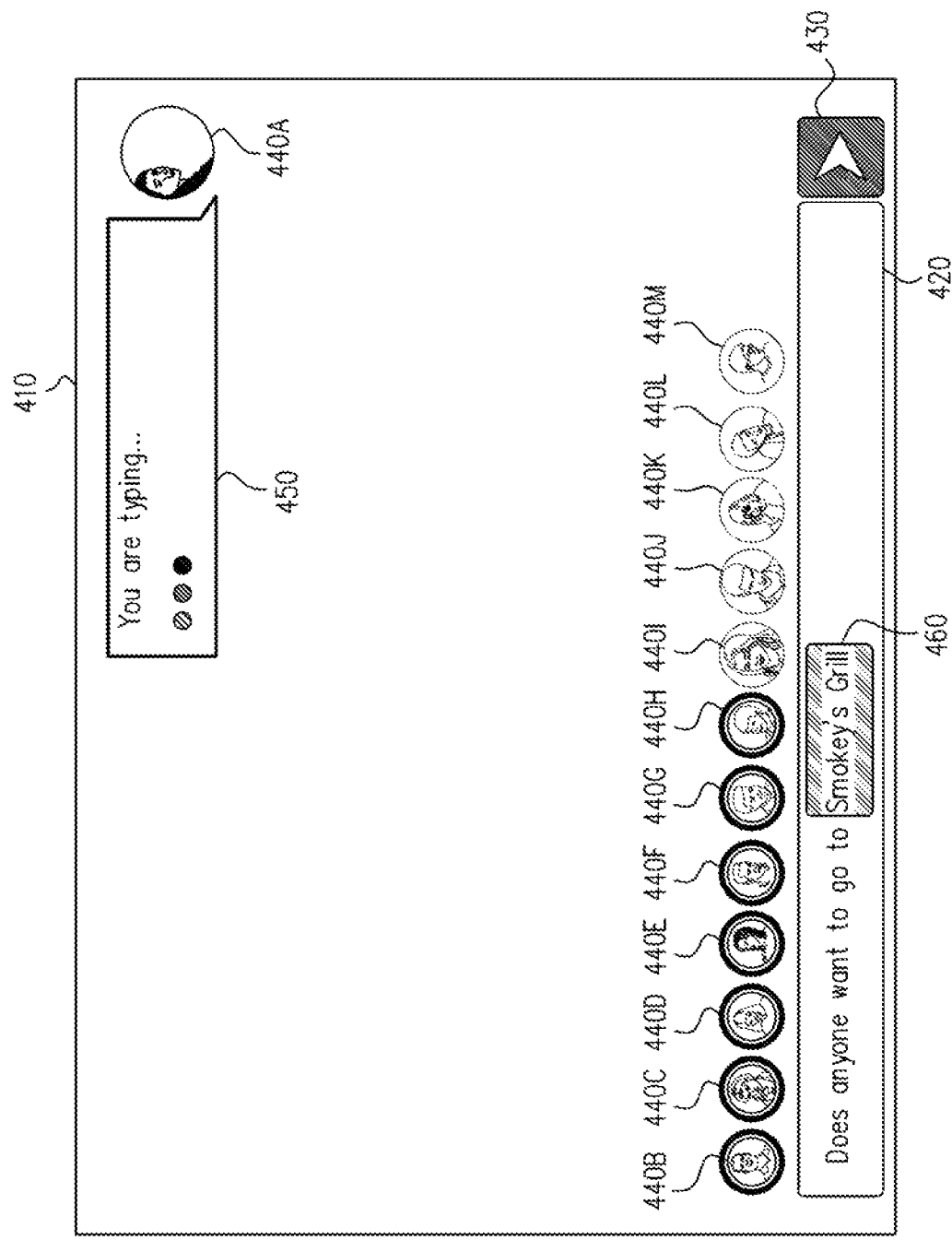

In FIG. 4C, after the first user begins typing several words, such as "Does anyone want to go to" which do not provide any information which can provide contextual information parameters, the first user now types words which have a contextual information parameter, "Smokey's Grill" 460, into the messaging user interface window 420. The term "contextual information parameter" is understood to refer to a word, or series of words containing some semantic information, based on which the system 100 (FIG. 1) can remove (or add) users from (or to) a chat.

Contextual information parameters include, but are not necessarily limited to location, presence, calendar information, organization relevant information, and so forth. By way of example, "Smokey's Grill" is intended to depict location in the present example. Users represented by icons 440J-M are filtered out.

However, if one user, represented by icon 440M is at home, sick, when the message is sent, even if that user is more or less in the same geographic location, that user might be removed from the chat. For example, if the user who is sick at home lives and works in San Jose, Calif., the user's colleagues who are also in the San Jose, Calif. office would be considered to be in the same geographic location. Nevertheless, since the sick user has not logged in this day, the messaging system detects that the user is not present.

Users from different organizations, e.g., sales and legal, might be removed from a chat, when such users are on the same team and in the same chat room. For example, if the first user had typed, "Does anyone want to go to" and completed the message with "the sales team meeting now?", then user 440L, a member of the legal organization on the team, might now be removed from the chat.

Another way users may be included or removed from a conversation would be based on calendar information. For example, if the messaging server has access to calendars of chat room participants, then, calendar information could be used as a type of contextual information parameter. For example, if the user represented by icon 440K has marked him or herself out of office for the week, the user represented by icon 440K might be removed from all group chats during the entire week. Alternatively, if the message is sent on the 14$^{th}$ of July, Pierre, a member of the team located in France, might be removed from the chat, as French holidays would be recognizable by the messaging system as contextual information parameters for chat room participants in France.

In embodiments of the system, user's calendars might be integrated with the system so that calendar items might be used to select users to add back into chats from which they were previously removed. For example, and without limiting the generality of the foregoing, flights, hotel stays and bookings, might be used as contextual information parameter indicating either an absence from a particular location, or a shared event which might be a basis of chats. Thus, a participant of the chat room might ordinarily be regularly removed from the chat, such as "let's go to lunch", and this regular filtering out has been learned by the machine learning 170. However, on a given day when that participant's calendar indicates that the participant of the chat room is visiting the same city as the initiator of the "let's go to lunch" thread, that participant might be added back in to the chat by the messaging server 150 after being initially removed from the chat. Alternatively, the participants of the chat room might not be removed from the chat while they are visiting that city.

Similarly, if several participants of the chat room are marked in their calendars as attending a meeting together, the system might use this contextual information parameter as an additional basis for not removing those users from certain chats. By way of example, if the messaging server 150 typically removes certain participants from a chat on the basis of geographic types of contextual information parameters, the calendar information might serve as a basis, now, for overriding the regular situation.

Figure 4D:
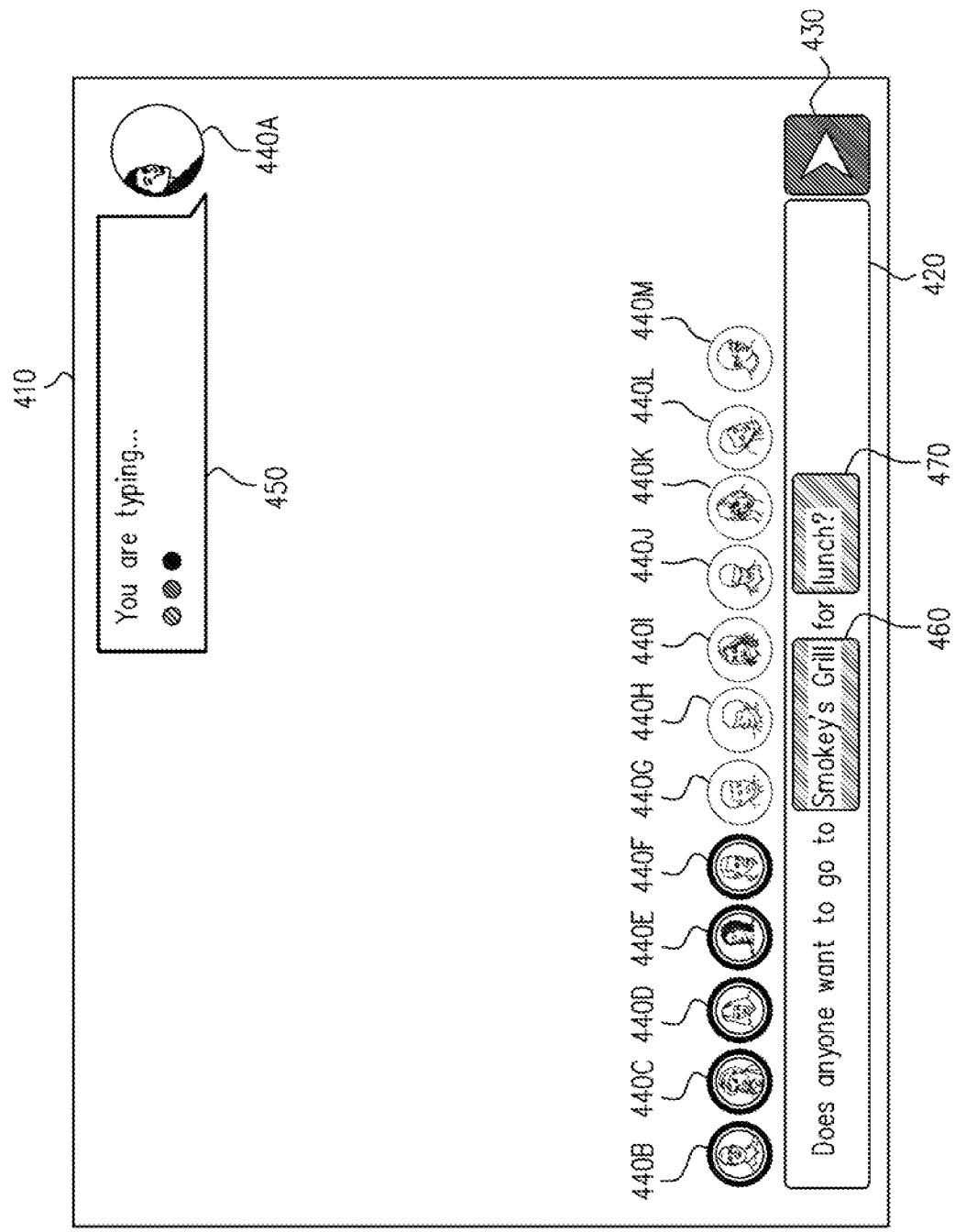

Continuing with the "Smokey's Grill" example, in FIG. 4D, as the first user continues to type, adding more contextual information parameters to the message, the NLU 160 (FIGS. 1 and 2) will continue to parse the additional words in the message for additional key phrases/words that can be used to determine which participants will find the message relevant. In this case, since "Smokey's Grill" is a contextual information parameter for a location, people that are nearby to Smokey's Grill are included in the chat. As additional contextual information parameter are added to the message, such as by typing, "for lunch?" 470, the recipient list will indicate which participants will receive the message and which participants will not receive the message (e.g. they will be greyed out). For example at this stage in the exemplary embodiment depicted in FIGS. 4A-4F, users 440G-M are now shown as greyed out.

Figure 4E:
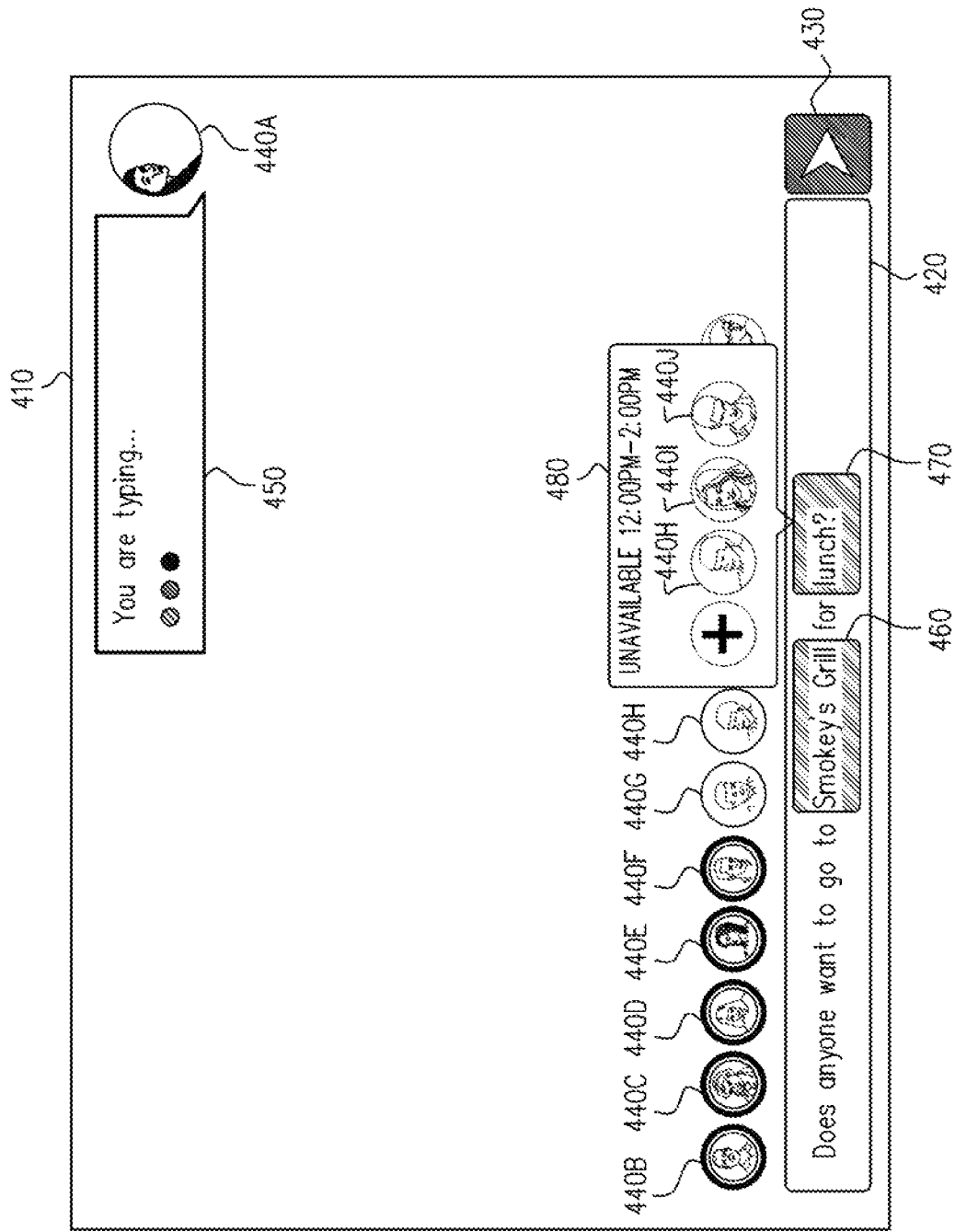

FIG. 4E depicts the NLU processor 160 (FIGS. 1 and 2) having been triggered by the word "lunch" to remove all participants of the chat room whose calendar indicates that they are unavailable from 12:00 PM-2:00 PM (lunch time, for the purposes of this example). It is appreciated that a user may "opt in" or "opt out" for a particular give contextual information parameter. For example, the user represented by icon 440H may receive a message that he or she is about to be removed from the group chat "Does anyone want to go to Smokey's Grill for lunch?". The user represented by icon 440H may then be queried by the system, with a message such as: "Your calendar indicates that you have a meeting with Harry at this time. Do you wish to still receive message in this chat?". The user represented by icon 440H can then opt in or out of further messages in the "lunch today" chat. The response of the user represented by icon 440H may then be further used as input to the machine learning 170, and in the future, the machine learning 170 may use a response to the message of the user represented by icon 440H when such conflicts occur in the future.

Similarly, the user writing the message or other participants of the group chat may click on the icon 440H-J of an unavailable user in order to add that user back into the chat, or click on the + sign to add other users into the chat.

Figure 4F:
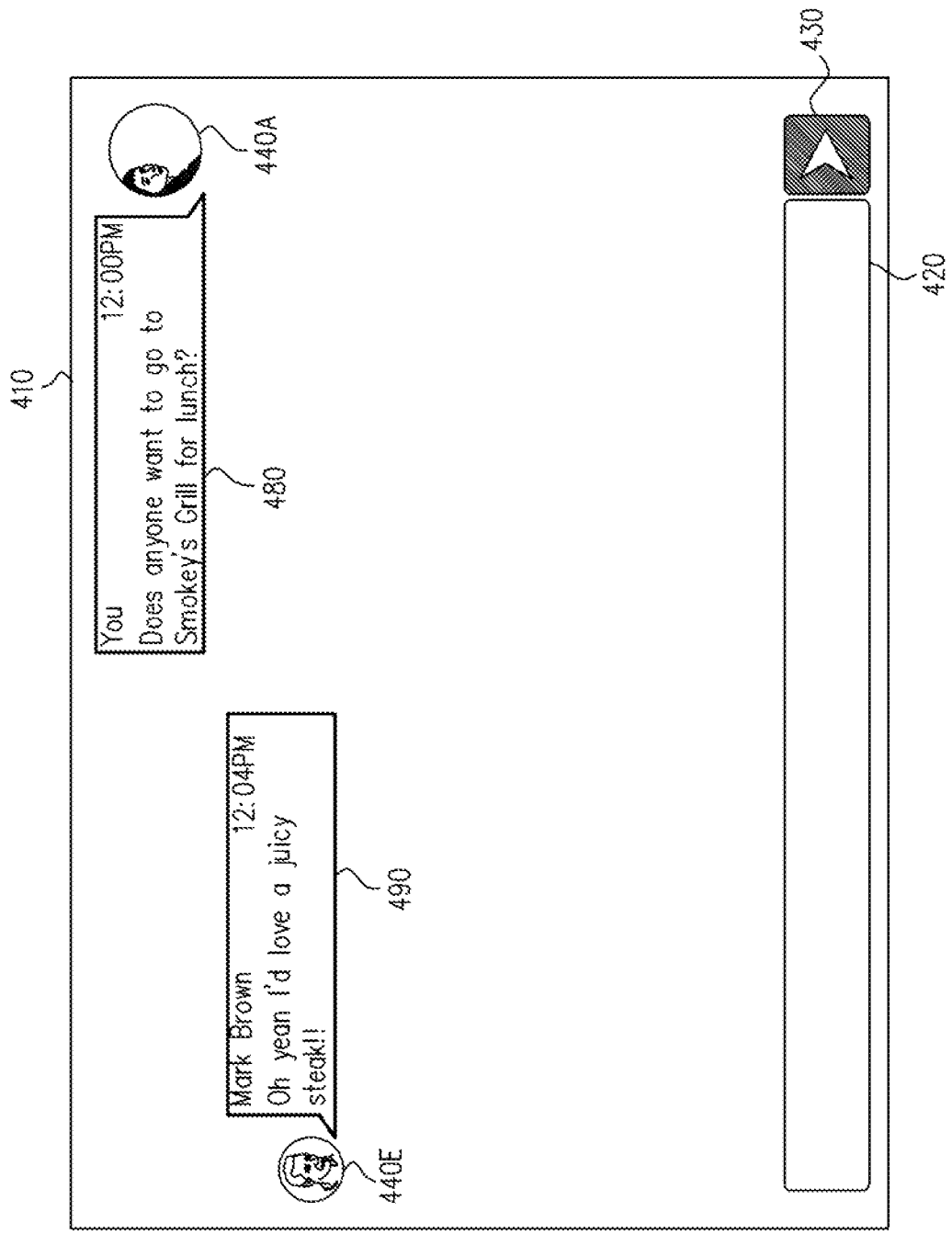

In FIG. 4F, the first user has now pressed the enter button 430, and the message in the messaging user interface window 420, "Does anyone want to go to Smokey's Grill for lunch" is sent to the non-removed chat room participants 440B-F (FIG. 4E). The message 480, accordingly, now appears as sent. The user represented by icon 440E has sent a response 490 to the message 480, which now appears as well in the messaging user interface window 410. The response 490 is visible to all participants of the chat room who have still not been removed from the chat.

It is appreciated that the above example is not meant to be limiting. For example, other indicators may be used as filters as well. Such potential filters might include information in user profiles, such as skill sets, business unit, level (e.g. Manager, Senior Manager, VP), and so forth.

Machine learning techniques, as are known in the art as well as behavioral analytics can be used to improve performance over time. By way of example, although one user may not indicate "vegetarianism" in their user profile, the behavioral analytics may notice that this user does not join chats having meat restaurant related contextual information parameters. The system may gradually learn to filter that user out of chats about meals at meat restaurants. It is appreciated that any appropriate known machine learning methods and behavioral analytics techniques may be used with the system described herein.

In some embodiments of the system, removed chat room participants may opt to receive those chats they were from which they were removed. For example, a messaging system menu may provide an option to "show all messages"; or to "hide all irrelevant messages"; or to "hide replies to all irrelevant messages", and so forth.

Figure 5:
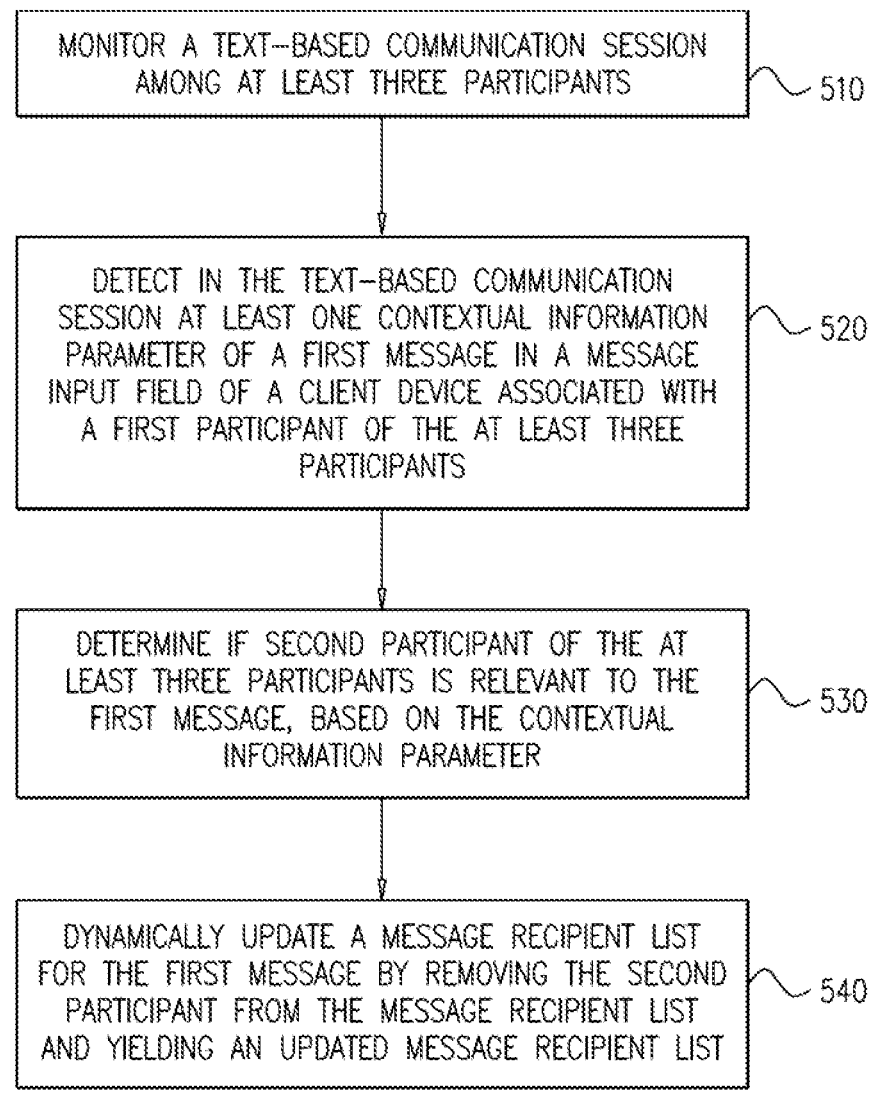
FIG. 5 is a flow chart of one method for implementing the system of FIG. 1.

Reference is now made to FIG. 5, which is a flow chart of one method for implementing the system of FIG. 1. At step 510, a text-based communication session among at least three participants is monitored by the system 100 of FIG. 1. At least one contextual information parameter of a first message in a message input field of a client device associated with a first participant of the at least three participants is then detected in the text-based communication session (step 520).

At step 530 the system 100 of FIG. 1 determines if a second participant of the at least three participants is relevant to the first message, based on the at least one contextual information parameter. At step 540 a message recipient list for the first message is dynamically updated by removing the second participant from the message recipient list and yielding an updated message recipient list.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method comprising:
monitoring a text-based communication session among at least three participants;
detecting in the text-based communication session at least one first contextual information parameter of a first message in a message input field of a client device associated with a first participant of the at least three participants;
determining if a second participant of the at least three participants is relevant to the first message, based on the at least one first contextual information parameter;
dynamically updating, in response to determining that the second participant is not relevant to the first message, a message recipient list for the first message by removing the second participant from the message recipient list and yielding an updated message recipient list;
detecting in the text-based communication session at least one second contextual information parameter of a second message in the message input field of a client device associated with a participant on the updated message recipient list;
determining if the second participant of the at least three participants is relevant to the second message, based on the at least one second contextual information parameter; and
dynamically updating, in response to determining that the second participant is relevant to the second message, the updated message recipient list for the second message by adding the second participant to the updated message recipient list and yielding a further updated message recipient list.

2. The method according to claim 1, wherein the determining further comprises storing a set of characteristics associated with the second participant, and comparing the at least one first contextual information parameter with the set of characteristics.

3. The method according to claim 2 wherein the set of characteristics comprises at least one of: calendar information; a current location; an office location; food preference; title or rank; or login information.

4. The method according to claim 1 wherein the dynamically updating the message recipient list for the first message is performed using machine learning.

5. The method according to claim 1 and further comprising displaying the updated message recipient list in a user interface of the client device.

6. The method according to claim 5 wherein the displaying further comprises distinguishing relevant and non-relevant participants.

7. The method according to claim 1 and further comprising receiving a user input indicating that recipients determined to be non-relevant should be included in the message recipient list.

8. The method according to claim 7 wherein the user input is received from a participant drafting the first message or a participant considered not relevant.

9. The method according to claim 7 wherein the user input is used as an input to a machine learning algorithm.

10. The method according to claim 1 wherein the first contextual information parameter is associated with contextual information that is at least one of: a geographical location; a time; a participant rank; an action; an event; or establishment.

11. A system comprising:
a network interface configured to enable network communications; and
a processor coupled to the network interface, wherein the processor is configured to:
monitor a text-based communication session among at least three participants;
detect at least one first contextual information parameter of a first message in a message input field of a client device associated with a first participant of the at least three participants;
determine if a second participant of the at least three participants is relevant to the first message, based on the at least one first contextual information parameter;
dynamically update a message recipient list for the first message by removing the second participant from the message recipient list and yielding an updated message recipient list;
detect in the text-based communication session at least one second contextual information parameter of a second message in the message input field of a client device associated with a participant on the updated message recipient list;
determine if the second participant of the at least three participants is relevant to the second message, based on the at least one second contextual information parameter; and
dynamically update, in response to determining that the second participant is relevant to the second message, the updated message recipient list for the second message by adding the second participant to the updated message recipient list and yielding a further updated message recipient list.

12. The system according to claim 11 wherein the processor is additionally configured to store a set of characteristics associated with the second participant, and comparing the at least one first contextual information parameter with the set of characteristics.

13. The system according to claim 12 wherein the set of characteristics comprises at least one of: calendar information; a current location; an office location; food preference; title or rank; and login information.

14. The system according to claim 11 wherein the dynamically updating the message recipient list for the first message is performed using machine learning.

15. The system according to claim 11 and further comprising the processor being configured to display the updated message recipient list in a user interface of the client device.

16. The system according to claim 15 wherein the processor is configured to display by displaying an indication of recipients not considered as relevant participants.

17. The system according to claim 11 and further comprising the processor being configured to receiving a user input indicating that recipients determined to not be relevant should be included in the message recipient list.

18. The system according to claim 17 wherein the user input is received from a participant drafting the first message or a participant considered not relevant.

19. The system according to claim 17 wherein the user input is used as an input to a machine learning algorithm.

20. The system according to claim 11 wherein the first contextual information parameter is associated with contextual information that is at least one of; a geographical location; a time; a participant rank; an action; an event; and establishment.

* * * * *